(12) United States Patent
Whitling et al.

(10) Patent No.: US 7,773,112 B2
(45) Date of Patent: Aug. 10, 2010

(54) AUTOMATIC MEASUREMENT OF VIDEO PARAMETERS

(75) Inventors: Justin F. Whitling, Brush Prairie, WA (US); Bozidar Janko, Portland, OR (US); Kathryn A. Engholm, Beaverton, OR (US); Frederick A. Azinger, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 1493 days.

(21) Appl. No.: 10/224,956

(22) Filed: Aug. 20, 2002

(65) Prior Publication Data
US 2004/0036773 A1   Feb. 26, 2004

(51) Int. Cl.
*H04N 17/00* (2006.01)
(52) U.S. Cl. .................. 348/180; 348/192
(58) Field of Classification Search .......... 348/180, 348/192, 722, 184; 702/66, 67, 69–71, 81, 702/117–120; 714/37, 39, 47, 48; 382/286, 382/309, 311; 715/723; 370/252
See application file for complete search history.

(56) References Cited

U.S. PATENT DOCUMENTS

| | | | |
|---|---|---|---|
| 4,504,851 A | | 3/1985 | Broberg et al. |
| 5,283,639 A | * | 2/1994 | Esch et al. ............. 725/32 |
| 5,319,453 A | * | 6/1994 | Copriviza et al. ........... 346/6 |
| 5,502,511 A | * | 3/1996 | Nagel ................. 348/704 |
| 5,867,584 A | * | 2/1999 | Hu et al. .............. 382/103 |
| 5,870,151 A | * | 2/1999 | Korber ................ 348/553 |
| 5,978,029 A | * | 11/1999 | Boice et al. .......... 375/240.14 |
| 6,233,226 B1 | * | 5/2001 | Gringeri et al. .......... 370/252 |
| 6,246,803 B1 | | 6/2001 | Gauch |
| 6,317,165 B1 | * | 11/2001 | Balram et al. ............ 348/699 |
| 6,357,042 B2 | * | 3/2002 | Srinivasan et al. .......... 725/32 |
| 6,378,132 B1 | * | 4/2002 | Grandin et al. .......... 725/146 |
| 6,389,168 B2 | * | 5/2002 | Altunbasak et al. ........ 382/224 |

(Continued)

FOREIGN PATENT DOCUMENTS

DE   196 36 011   3/1998

(Continued)

OTHER PUBLICATIONS

EPO Rejection in 03 255 116.0, dated May 25, 2004.

(Continued)

*Primary Examiner*—Victor Kostak
(74) *Attorney, Agent, or Firm*—Francis I. Gray; Matthew D. Rabdau

(57) ABSTRACT

A system and method for automatic measurement of video parameters for a video sequence using a video processor that has a software waveform monitor implemented as an integral part of a video processing application run by the video processor. Each frame of the processed video sequence, either in realtime as processed by the video processor, in near realtime after storage by the video processor in a storage device, or in the background for each video sequence stored in the storage device, is analyzed against specified parameters for legalization and/or color balancing of the video sequence. The analysis results may be reported as a display in several forms—an error image map, an error log, a timeline graphic, etc. The analysis results may also be provided to the video processor for automatic correction of the video sequence when the specified parameters are not satisfied.

18 Claims, 3 Drawing Sheets

U.S. PATENT DOCUMENTS

| | | | |
|---|---|---|---|
| 6,493,023 B1 * | 12/2002 | Watson | 348/180 |
| 6,678,413 B1 * | 1/2004 | Liang et al. | 382/181 |
| 6,856,600 B1 * | 2/2005 | Russell et al. | 370/244 |
| 6,867,814 B2 * | 3/2005 | Adams et al. | 348/448 |
| 6,888,643 B1 * | 5/2005 | Grimes | 358/1.15 |
| 7,072,403 B2 | 7/2006 | Kimoto | |
| 7,076,102 B2 * | 7/2006 | Lin et al. | 382/218 |
| 2001/0036356 A1 * | 11/2001 | Weaver et al. | 386/52 |
| 2002/0036631 A1 * | 3/2002 | Perez | 345/204 |
| 2002/0071029 A1 * | 6/2002 | Zell et al. | 348/97 |
| 2003/0023592 A1 * | 1/2003 | Modica et al. | 707/6 |

FOREIGN PATENT DOCUMENTS

| | | |
|---|---|---|
| EP | 0 940 671 | 9/1999 |
| GB | 2364461 A | 1/2002 |

OTHER PUBLICATIONS

D5: L. Durant: "Konkurrenz fur den k-Faktor, Fernseh- und Kinotechnik" (English Translation: "Competition for the k-factor, Television and Cinema Technology"), 51(3), 1997, pp. 109-112. (Complete English Translation attached.).

* cited by examiner

AUTOMATIC MEASUREMENT OF VIDEO PARAMETERS

BACKGROUND OF THE INVENTION

The present invention relates to the measurement of video signals, and more particularly to the automatic measurement of video parameters in a video production environment.

The video production environment today usually involves a number of video sources, such as cameras, tapes, satellite feeds, etc., a computer environment for editing video material, and a distribution environment, such as broadcast networks, cable television, etc., as illustrated in FIG. 1. Video editing sometimes produces video signals that have characteristics incompatible with broadcasting requirements, such as out-of-gamut color, excessive luminance levels, improper signal modulation range, excessive audio levels, etc. Further video editing often involves balancing for color consistency between different shots of the same video scene, either taken at different times (different lighting conditions), by different cameras (multi-camera shoots), etc. Therefore it is customary to send the results of the video editing through a video waveform monitor, such as a WFM700 Waveform Monitor manufactured by Tektronix, Inc. of Beaverton, Oreg., and/or other monitoring instruments (audio and video) before sending them on to the distribution environment. The video signal inspection process is manual and is often done by sampling rather than doing 100% testing, as the manual process is time consuming. Also in the background server application stored video may be checked in the same way prior to dissemination or when any changes are made.

Thus what is desired is automatic measurement of video parameters of video signals in a production environment that performs 100% testing with minimal time consumption.

BRIEF SUMMARY OF THE INVENTION

Accordingly the present invention provides for automatic measurement of video parameters in a video production environment that is implemented in the same computer environment as the video signal is processed. A software waveform monitor or similar measurement device may be incorporated as part of the video production environment or may be implemented as part of a background server application. Each frame of a video sequence that is processed by the video processor is examined for out-of-limits conditions and/or color unbalance conditions on a pixel-by-pixel basis. The processed video is converted to an appropriate format and compared with specified limit parameters that define out-of-limits conditions or is compared to a corresponding frame of the same scene shot under different conditions (time or camera) for auto-balancing. The monitor results may be flagged as alarms, may be stored as a report, may be used to render a defect map for display by the video processor, may generate entries into a processor script or timeline, or may provide correction parameters for automatically correcting out-of-limit or unbalanced pixels by the video processor.

The objects, advantages and other novel features of the present invention are apparent from the following detailed description when read in conjunction with the appended claims and attached drawing.

DETAILED DESCRIPTION OF THE INVENTION

Figure 2:
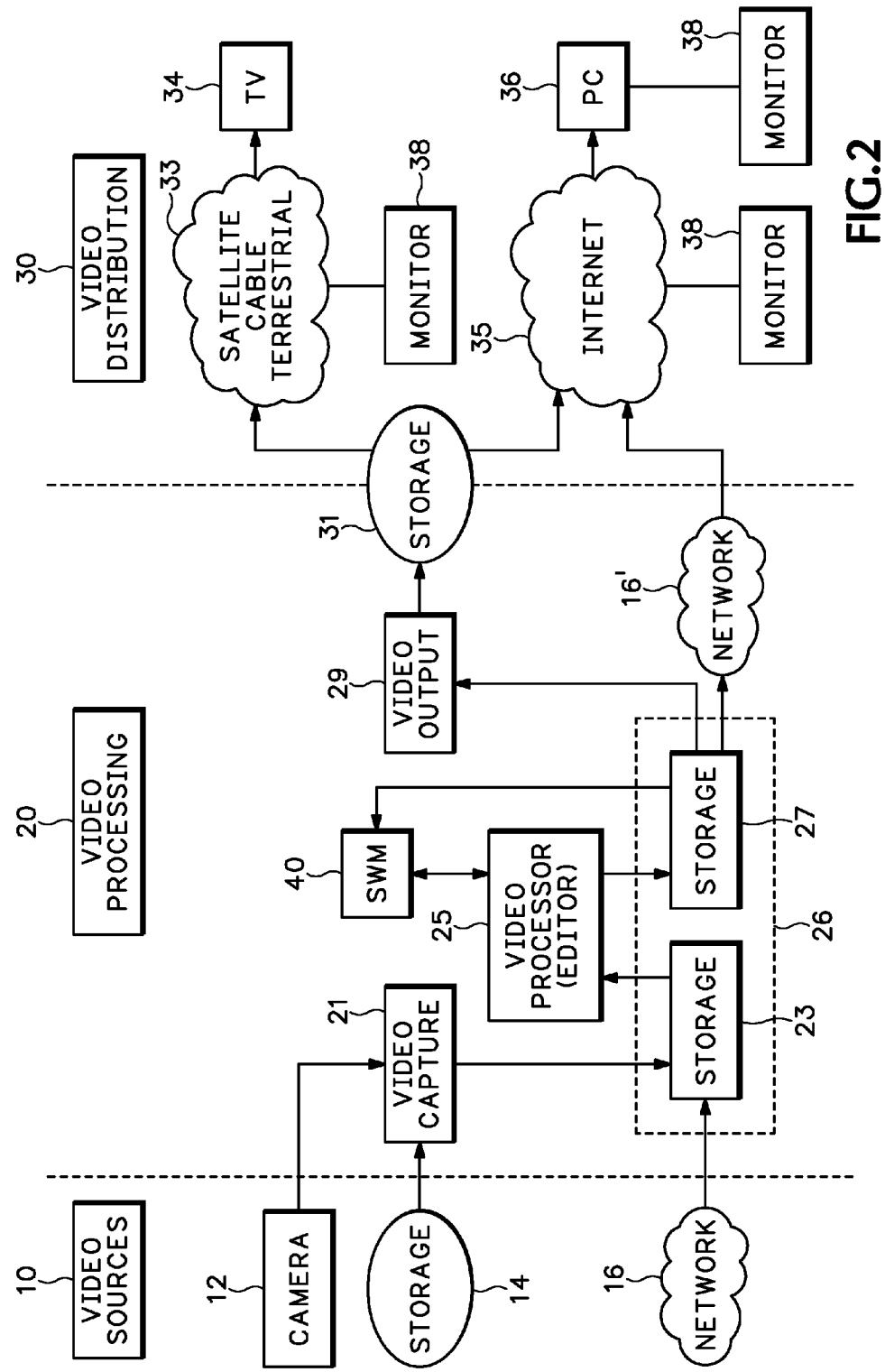
FIG. 2 is a block diagram view of a video production environment using automatic measurement of video parameters according to the present invention.

Referring now to FIG. 2 a video production environment is shown having video sources 10, such as cameras 12, stored video (analog or digital) mediums 14 and network sources 16. These video sources 10 are input to a video production computer environment 20 that includes a video capture card 21 for receiving realtime video from the cameras 12 or stored video from storage sources 14, converting it to an appropriate format for the computer environment 20 and storing it in an input storage medium 23. Video from the network sources 16 generally is already in the appropriate format and may be stored directly in the input storage medium 23. The video from the input storage medium 23 is accessed by a computer processor 25 running a video processing application, such as a video editor, and the processed results are stored in an output storage medium 27. The input and output storage mediums 23, 27 may be part of a single computer storage medium 26. From the output storage medium 27 the processed video may be provided to a distribution environment 30 either directly over a computer network 16' or via a video output card 29 for conversion to an appropriate distribution format before storage in a distribution storage medium 31. The distribution environment 30 includes satellite, cable and terrestrial networks 33 coupled to an end user's television set 34 or distribution computer networks 35, such as the Internet or World Wide Web, coupled to an end user's computer 36. Both the distribution storage medium 31 output and the computer network 16' from the processing environment 20 may provide processed video to the distribution computer networks 35, while the distribution storage medium is the source of the processed video for the satellite, cable and terrestrial networks 33. The processed video generally is monitored (38) at several points in the distribution network 30. Such monitoring may be performed by hardware monitors, such as the WFM700 monitor mentioned above, or may be included as part of the distribution system applications software as described below with respect to the video processing environment 20.

Figure 1:
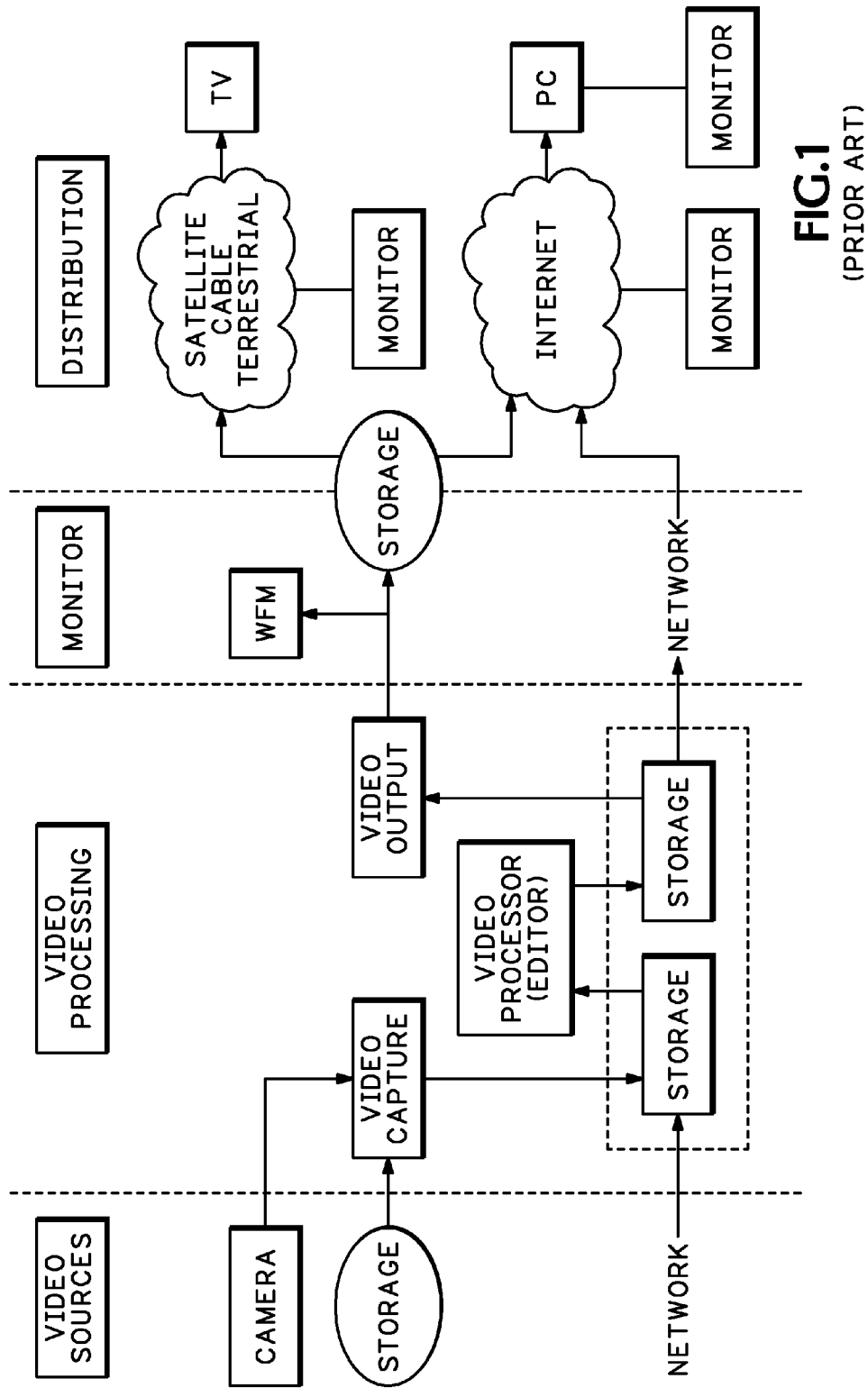
FIG. 1 is a block diagram view of a video production environment using manual measurement of video parameters for video processing results according to the prior art.

Rather than using an external hardware waveform monitor coupled between the output of the processing environment 20 and the distribution environment 30, as shown in FIG. 1, a software waveform monitor (SWM) 40 is included as part of the processing environment 20 to provide automatic measurement of each pixel of video in the output storage medium 27. Not only does the SWM 40 provide 100% measurement capability, but it also may be used to provide input to the video processor 25 for automatically correcting pixels within the output storage medium 27 that are "illegal" or that require auto-balancing prior to output to the distribution environment 30.

Figure 3:
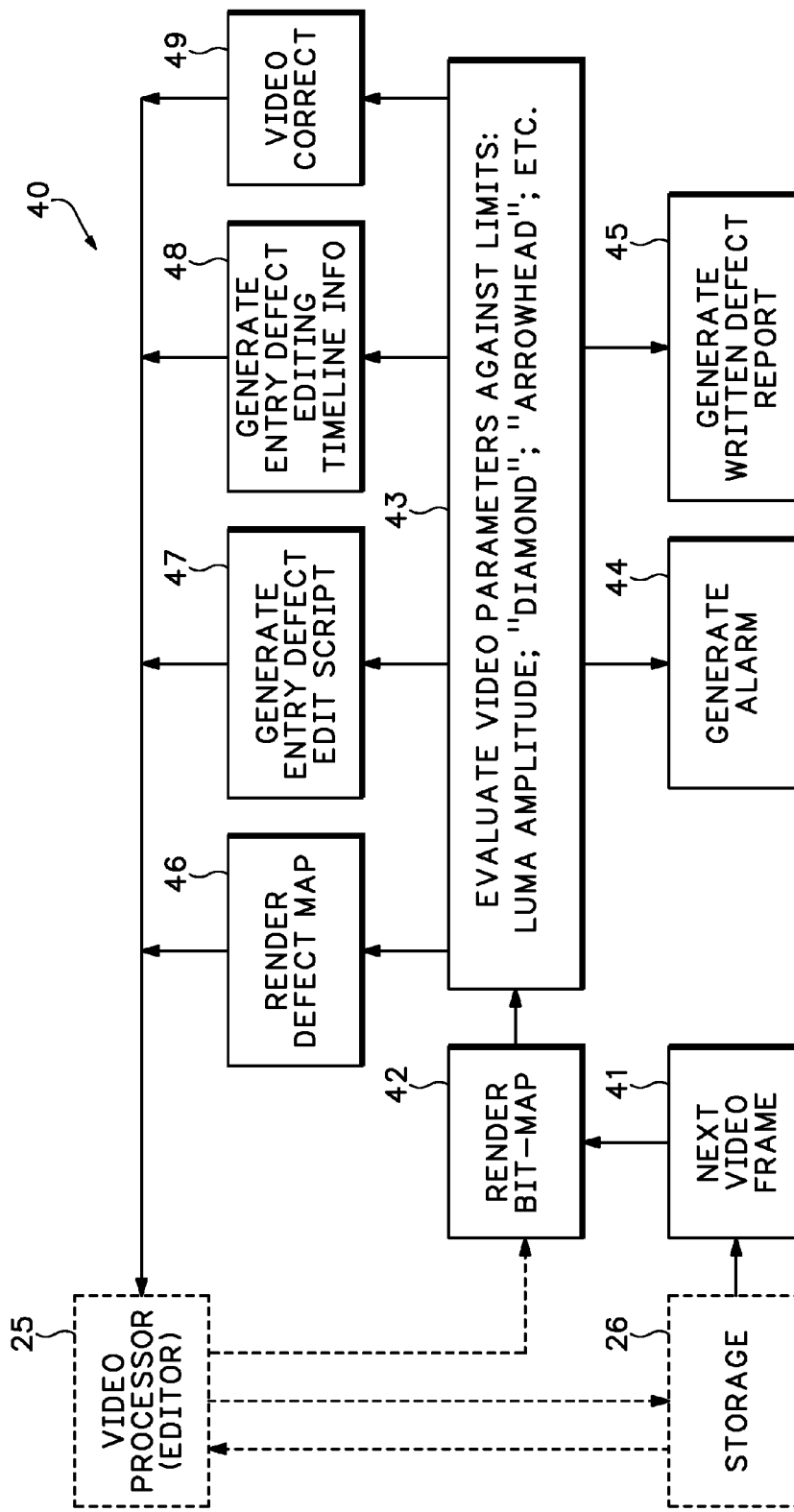
FIG. 3 is a process flow diagram view for the automatic measurement of video parameters according to the present invention.

As shown in FIG. 3 video material is read from the computer storage 26 after processing by the video processor 25 frame-by-frame at step 41 and internally rendered into a format at step 42 that is ultimately produced by the video processor. This internal format, usually a pixel bit-map, is then analyzed at step 43 by comparing pixel values against pre-set parameter limits or corresponding pixels from a prior image of the same scene (for auto-balancing). This analysis evaluates parameters, such as luma amplitude, color gamut, projected signal modulation range, audio levels, etc., in a fashion similar to that done by conventional, stand-alone hardware instruments, such as waveform monitors, vectorscopes, etc. that use "Diamond" and "Arrowhead" displays (proprietary to Tektronix, Inc.—see U.S. Pat. Nos. 5,307,087 and 5,519,440) or the like.

When one or more of the measurements (step 43) exceed the pre-set limits, several actions may be precipitated. One action is activating an alarm (step 44). Another is producing a written record indicating the type of alarm event, the location in the video sequence (expressed in VTC/LTC/time/framecount), and the magnitude of signal runout (step 45). This record may be stored and used for quality documentation or to correct the error in the video file. Another result of the alarm event may be to render a defect map for the area where the parameter runouts occurred in the video sequence corresponding to the sequence under test (step 46). This is then used by the video processor 25 for identification of problem areas when the sequences are viewed in the video processing environment 20. Yet another result may be an entry in a video editing script (step 47) that allows quick navigation by the video processor 25 to identified problem areas. The problem location, type and extent may also be indicated graphically in a "timeline" format (step 48) and be inserted into the timeline window used in the video processor 25. Optionally the video under test may be automatically altered (step 49) to bring the video parameters into the desired range, a "legalization" process, by providing correction parameters or auto-balancing parameters to the video processor 25. For realtime monitoring the video results from the video processor 25 may be input directly to the rendering step 42 and analyzed prior to outputting the video results to the storage unit 26.

The "defect scrubbing" may be decoupled from the video processing to automate the process of finding and repairing defects in the processed video. This may be implemented as something analogous to a disk-fragmenter. It runs in the background on a video server (where the storage medium 26 may be contained). It searches all stored video for defects and either automatically repairs any video defects or logs/queues the defects as requiring operator interaction. In this way the video production facility is always sure that the video on its video server is, and will remain, defect free.

Thus the present invention provides for automatic measurement of video parameters in a video production environment by comparing each pixel frame-by-frame with pre-set parameter limits as part of the video processing and using the comparison results for feedback to the video processing and/or for automatic "legalization" or auto-balancing of pixel values.

What is claimed is:

1. A system for automatic measurement of video parameters comprising:
    a video processing environment having a digital processor for processing a sequence of video images from a storage device and for storing the sequence of video images after processing in the storage device; and
    a software waveform monitor integrated into the video processing environment such that the sequence of video images is analyzed frame by frame according to specified parameters prior to output from the storage device to a distribution environment, wherein the software waveform monitor operates in the background independent of the video processor to assure that the sequence of video images in the storage device is analyzed and corrected frame by frame according to the specified parameters.

2. The system as recited in claim 1 wherein the software waveform monitor operates in realtime by analyzing the sequence of video images frame by frame after processing by the video processor prior to outputting from the video processor to the storage device.

3. The system as recited in claim 1 wherein the software waveform monitor operates in near realtime on the sequence of video images in the storage device frame by frame after processing by the video processor.

4. The system as recited in claim 1 wherein the specified parameters define out-of-limits conditions for the sequence of video images.

5. A system for automatic measurement of video parameters comprising:
    a video processing environment having a digital processor for processing a sequence of video images from a storage device and for storing the sequence of video images after processing in the storage device; and
    a software waveform monitor integrated into the video processing environment such that the sequence of video images is analyzed frame by frame according to specified parameters prior to output from the storage device to a distribution environment, wherein the specified parameters define color unbalance between related sequences of video images.

6. The system as recited in claim 5 wherein the software waveform monitor operates in realtime by analyzing the sequence of video images frame by frame after processing by the video processor prior to outputting from the video processor to the storage device.

7. The system as recited in claim 5 wherein the software waveform monitor operates in near realtime on the sequence of video images in the storage device frame by frame after processing by the video processor.

8. The system as recited in claim 5 wherein the specified parameters define out-of-limits conditions for the sequence of video images.

9. A method of automatically monitoring a video sequence from a storage device by a video processor comprising the steps of:
    evaluating video parameters for each frame of the video sequence against specified parameters prior to transmission to a distribution environment from the storage device, wherein the specified parameters are selected from the group consisting of luma amplitude, color gamut, and projected signal modulation; and
    alerting an operator when the video sequence fails to satisfy the specified parameters.

10. The method as recited in claim 9 wherein the evaluating step occurs as the video sequence is output by the video processor prior to outputting into the storage device.

11. The method as recited in claim 9 wherein the evaluating step occurs in near realtime on the video sequence stored in the storage device after processing by the video processor.

12. The method as recited in claim 9 wherein the alerting step comprises providing a display for an operator of the video processor.

13. The method as recited in claim 12 wherein the display comprises one selected from the group consisting of an error image map, an error log, a timeline graphic and a defect report.

14. The method as recited in claim 9 further comprising the step of providing to the video processor control parameters as a result of the evaluating step for automatically correcting the video sequence when the specified parameters are not satisfied.

15. A method of automatically monitoring a video sequence from a storage device by a video processor comprising the steps of:

evaluating video parameters for each frame of the video sequence against specified parameters prior to transmission to a distribution environment from the storage device, wherein the specified parameters are selected from the group consisting of luma amplitude, color gamut, and projected signal modulation; and alerting an operator when the video sequence fails to satisfy the specified parameters, wherein the evaluating step occurs in the background on each video sequence that is stored in the storage device to assure all video sequences satisfy the specified parameters.

16. The method as recited in claim 15 wherein the alerting step comprises providing a display for an operator of the video processor.

17. The method as recited in claim 16 wherein the display comprises one selected from the group consisting of an error image map, an error log, a timeline graphic and a defect report.

18. The method as recited in claim 15 further comprising the step of providing to the video processor control parameters as a result of the evaluating step for automatically correcting the video sequence when the specified parameters are not satisfied.

* * * * *